United States Patent
Potier et al.

(10) Patent No.: US 7,448,366 B2
(45) Date of Patent: Nov. 11, 2008

(54) HEATER FOR A CANISTER

(75) Inventors: Vincent Potier, Brussels (BE); Philippe Georis, Chelles (FR)

(73) Assignee: Inergy Automotive Systems Research (Société Anonyme), Brussels (BE)

(*) Notice: Subject to any disclaimer, the term of this patent is extended or adjusted under 35 U.S.C. 154(b) by 0 days.

(21) Appl. No.: 11/316,004

(22) Filed: Dec. 22, 2005

(65) Prior Publication Data

US 2006/0174857 A1 Aug. 10, 2006

(30) Foreign Application Priority Data

Dec. 24, 2004 (FR) .................. 04 13901

(51) Int. Cl.
*F02M 37/04* (2006.01)
(52) U.S. Cl. .................. 123/519; 123/549
(58) Field of Classification Search .......... 123/549, 123/556, 520, 557, 519, 518, 516, 543; 392/485, 392/486
See application file for complete search history.

(56) References Cited

U.S. PATENT DOCUMENTS

| | | | | |
|---|---|---|---|---|
| 1,065,580 A * | 6/1913 | Beucus | .................. | 48/103 |
| 3,784,385 A * | 1/1974 | Nekrasov et al. | .................. | 501/84 |
| 4,141,327 A * | 2/1979 | Marcoux et al. | .................. | 123/549 |
| 4,279,234 A * | 7/1981 | Marcoux et al. | .................. | 123/549 |
| 4,387,690 A * | 6/1983 | Chiavaroli | .................. | 123/549 |
| 4,548,186 A * | 10/1985 | Yamaji et al. | .................. | 123/556 |
| 4,598,686 A * | 7/1986 | Lupoli et al. | .................. | 123/519 |
| 4,721,846 A * | 1/1988 | Lupoli et al. | .................. | 219/206 |
| 4,846,135 A * | 7/1989 | Tiphaine | .................. | 123/520 |
| 5,000,152 A * | 3/1991 | McCauley | .................. | 123/536 |
| 5,611,392 A * | 3/1997 | Malecek et al. | .................. | 165/47 |
| 5,666,804 A * | 9/1997 | Sekiya et al. | .................. | 60/284 |
| 6,098,601 A * | 8/2000 | Reddy | .................. | 123/520 |
| 6,109,247 A * | 8/2000 | Hunt | .................. | 123/549 |
| 6,230,693 B1 | 5/2001 | Meiller et al. | | |
| 6,769,415 B2 * | 8/2004 | Reddy et al. | .................. | 123/519 |
| 6,944,394 B2 * | 9/2005 | Long et al. | .................. | 392/485 |
| 7,059,306 B2 * | 6/2006 | Reddy | .................. | 123/518 |
| 2002/0015585 A1 * | 2/2002 | Jensen et al. | .................. | 392/485 |

* cited by examiner

*Primary Examiner*—Thomas N Moulis
(74) *Attorney, Agent, or Firm*—Connolly Bove Lodge & Hutz LLP

(57) ABSTRACT

Heater for a fluid intended to pass through a canister for a fuel tank, comprising a casing fitted with two end pieces, a hollow body situated inside the casing and at least one heating element.

11 Claims, 1 Drawing Sheet

HEATER FOR A CANISTER

Figure 1:
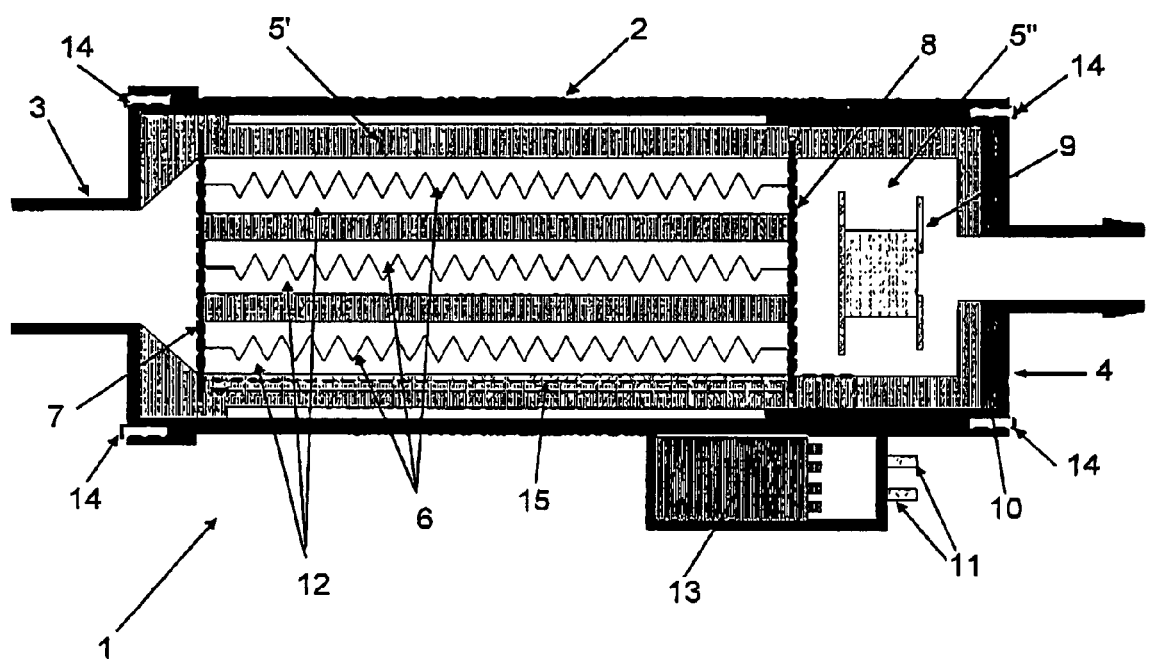

The present invention relates to a heater for a fluid intended to pass through a canister for a fuel tank.

Fuel vapours which escape from a fuel system are a source of hydrocarbon emissions in motor vehicles. Fuel leaks through defective sealing and evaporative losses have been the special subject of increasingly tight regulations, particularly for applications to motor vehicles.

Now, fuel tanks, especially those for motor vehicles, usually comprise a vent orifice or breather allowing the internal pressure to balance with the atmospheric pressure, for example as the fuel level varies as a result of the tank being filled or the fuel being consumed by the engine, or alternatively as the temperature varies. Thus, in order to meet the aforementioned standards, his breather is conventionally connected to the atmosphere via a pipe and a chamber, commonly known as a canister, containing a substance that adsorbs fuel vapours, usually active carbon. The role of the canister is to avoid fuel vapours being released into the atmosphere. At regular intervals, the canister is purged, that is to say that the vapours are desorbed, generally by means of a stream of air, and sent to the engine air intake system where they are burnt.

One major problem with the systems for controlling evaporative losses using active carbon as the adsorbent material in the canister is that under low ambient temperature conditions the fuel that has been adsorbed is difficult to release and to purge from the canister. It has been found that, with the absorbents currently used, satisfactory release of the stored fuel occurs at ambient temperature or above this temperature. When the temperatures drop well below ambient temperature, the effectiveness of the system is significantly impaired. It is therefore advantageous to increase the temperature inside the canister. The improvement in desorbtion means that the adsorbent is more active because it is better desorbed.

Devices for heating the adsorbent inside the canister are known from the prior art. Document U.S. Pat. No. 6,230,693 B1 discloses a device comprising two canisters—a main canister and an auxiliary canister—the auxiliary canister comprising a heating device which operates when the active carbon is being regenerated (that is to say when the carbon is desorbing the fuel vapours it has adsorbed) by passing a stream of air from the atmosphere through the auxiliary canister and through the main canister. That device has the disadvantage that the air passing through the auxiliary canister experiences additional pressure drops because of the presence of active carbon within the canister. The consequences of this are twofold: on the one hand, since the purged air finds it more difficult to flow, its flow rate has to be adapted in order to obtain the same adsorbent regeneration performance and, on the other hand, when the fuel tank is being filled, the vapours emitted find it less easy to escape through the breather circuit. At high flow rate in particular, this may cause pressure in the fuel tank to rise and cause a fuel nozzle used to fill the tank to cut-off prematurely.

In order to palliate the abovementioned disadvantages, it is therefore an object of the present invention to provide a heater that allows the purged air to be heated before it passes through the canister while at the same time introducing little or no additional pressure drop.

To this end, the present invention relates to a heater for a fluid intended to pass rough a canister for a fuel tank, comprising:
- a casing fitted with two end pieces;
- a hollow body situated inside the casing and being hollowed out with at least one duct the ends of which open into the end pieces of the casing;
- at least one heating element placed inside the duct.

The heater according to the invention is a component which is generally independent, intended to heat the purge air flowing to a canister and which is associated with the said canister. It comprises a casing which constitutes an outer wrapper made of one or more assembled parts, and which is equipped with two end pieces.

In one particular embodiment, the casing comprises at least one part of tubular overall shape, open at both ends, and two other parts, each equipped with an end piece, assembled or incorporated, by way of caps, with the ends of the first part so as to form a wrapper.

According to the invention, one end piece generally corresponds to an inlet and the other end piece to an outlet when the purge air is circulating. The casing is then preferably associated with the canister in such a way that the outlet end piece is connected to a canister breather.

The shape and size of the end pieces are generally defined in such a way that combining the heater with the canister requires no special arrangements at canister level. However, an intermediate element may be positioned between the outlet end piece of the heater and the canister breather.

The heater described hereinabove has the advantage of being a standard element that can be associated with any kind of canister.

According to the invention, the heater comprises a hollow body, that is to say a body hollowed out with at least one duct, intended for the circulation of a fluid.

As a preference, the hollow body is hollowed out with several ducts of substantially circular cross section the ends of which open into the end pieces of the casing.

As a preference, the hollow body also comprises a chamber which comprises a device for controlling the temperature inside the heater. This device may for example consist of a device of the bimetallic strip type which controls the electric relay mentioned hereinabove. When the control device detects that the temperature within the component is exceeding a threshold temperature, it sends an electrical signal to the electrical relay which cuts off the power supply to the heating elements. In particular, if the device concerned is of the bimetallic strip type, the latter opens when the said temperature threshold value is exceeded.

According to the invention, heating elements are housed inside the duct, joining the two ends of the duct and fixed to these ends.

The heating elements may be resistive heating elements the material and cross section of which are determined according to the application, that is to say in general according to the amount of heat to be released in the heater. They are powered (for example with a voltage of 12 volts) through an electric relay.

In particular, the heating elements are fixed to plates positioned near the end pieces, at right angles to the ducts.

As a preference, the ends of the heating elements which are situated on one and the same side of the component are joined together, for example via a plate.

As a more especial preference, in the case of resistive heating elements, this plate is at least partially conductive, so that it can be connected in parallel from the electrical point of view.

In particular, the ends of the heating elements are welded to a plate which is positioned transversely with respect to the flow of the purge air.

The hollow body may be made of any material, preferably thermally insulating, so that the heat given off by the heating elements in the ducts remains confined therein and is not released to the casing and to the outside of the heater.

As a preference, the hollow body is made of an insulator of the cellular concrete type such as the YTONG® cellular concrete for example.

The casing is preferably made of a material that has a thermal resistance tailored to the temperatures of the fluid likely to pass through the heater. This material may be a plastic or metal.

Thermoplastics yield good results in the context of the invention provided that the hollow body is made of an insulating material, particularly because of the advantages of weight, mechanical strength, thermal and chemical resistance, and ease of use. The term "thermoplastic" denotes any thermoplastic polymer, including thermoplastic elastomers, and blends thereof. The term "polymer" denotes both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10° C. are particularly suitable. Examples of such materials include those that exhibit polydispersion in their molecular weight.

Use may be made of polyamides and copolymers thereof, these being preferred for their thermal resistance. A blend of polymers or of copolymers may also be used, as may a blend of polymer materials with inorganic, organic and/or natural fillers such as, for example, but non-limitingly, carbon, salts and other inorganic derivatives, natural fibres, glass fibres and polymeric fibres. It is also possible to use multilayer structures consisting of stacked layers bonded together comprising at least one of the polymers or copolymers described above.

The canister with which the heater according to the invention is associated is particularly intended for combustion engines supplied with volatile liquid fuels and, in particular, for engines of motor vehicles (motor cars, lorries, motorcycles, etc.).

A "fuel" is intended to denote a liquid or gaseous volatile hydrocarbon suitable for supplying to internal combustion engines. The canister according to the invention is particularly well suited to volatile liquid hydrocarbons. The expression "volatile liquid hydrocarbon" denotes a liquid hydrocarbon (which, under the normal conditions of use of the engine, is in the liquid state in the fuel tank of the fuel system) which has a saturated vapour tension in excess of 1 bar at 293 K (20° C.). Volatile liquid hydrocarbons commonly used to supply to motor vehicle combustion engines are those sold commercially under the name "petrol" or "gasoline" and intended for controlled-ignition combustion engines otherwise known as spark-ignition engines.

The invention also relates to a canister associated with a heater as described hereinabove.

The invention also relates to a fuel system comprising a fuel tank and a canister as described hereinabove.

In preference, the fuel system comprises a canister associated with the heater in such a way that one end piece of the casing collaborates with a canister air vent.

As a more especial preference still, the fuel system comprises a fuel leak detection device (for example of the OBD type) which is connected to the inlet end piece of the heater.

The present invention is illustrated non-limitingly by FIG. 1 which depicts an advantageous variant of the device according to the invention.

The heater (1) comprises a casing (2) to the ends of which end pieces (3) and (4) are secured using fixings (14). Inside the casing (2) there is a block made up of a hollow body (5') and of a thermal regulating device (9) directed longitudinally with respect to the casing (2). The hollow body (5') is hollowed with several ducts (12) and with a chamber (5") containing the thermal regulating device (9). The block is held in place inside the casing (2) by means of an insert (10) which may, for example, consist of a plate made of an elastic material which compensates for dimensional discrepancies between the block and the casing (2).

Housed in the ducts (12) are heating filaments (6) the ends of which are welded respectively to plates (7) and (8). The heating filaments (6) are powered through electrical wiring (15), by a power supply (13) external to the heater (1) and itself supplied with electrical power via terminals (11).

The invention claimed is:

1. Heater for air flowing to a canister for a fuel tank comprising:
   a casing fitted with two end pieces, the casing being formed of a thermoplastic material;
   a hollow body situated inside the casing and being hollowed out with at least one duct the ends of which open into the end pieces of the casing, wherein the hollow body is made of an insulating material;
   at least one resistive heating element placed inside the duct.

2. The heater according to claim 1, wherein the hollow body comprises a chamber which comprises a device for controlling the temperature inside the heater.

3. The heater according to claim 2, wherein the temperature control device is a device of the bimetallic strip type.

4. The heater according to claim 1, wherein the at least one heating element is fixed to plates positioned near the end pieces at right angles to the ducts.

5. The heater according to claim 1, wherein the casing is made of a thermoplastic chosen from polyamides or copolymers thereof.

6. The heater according to claim 5, wherein the insulating material is a cellular concrete.

7. Canister for a fuel tank associated with a heater according to claim 1.

8. Canister for a fuel tank associated with a heater according to claim 6.

9. Fuel system comprising a fuel tank and the canister according to claim 7.

10. Fuel system comprising a fuel tank and the canister according to claim 8.

11. Fuel system according to claim 9, wherein the canister is associated with the heater in such a way that one end piece of the casing collaborates with a canister air vent.

* * * * *